United States Patent [19]

Murphy et al.

[11] 4,170,185
[45] Oct. 9, 1979

[54] PREVENTING MARINE FOULING

[75] Inventors: Preston V. Murphy, Geneva, Switzerland; Mireille J. Latour, Montpellier, France

[73] Assignee: Lectret S.A., Geneva, Switzerland

[21] Appl. No.: 867,676

[22] Filed: Jan. 9, 1978

[51] Int. Cl.² .............................................. B63B 59/02
[52] U.S. Cl. .................................. 114/222; 310/337; 114/67 R
[58] Field of Search ............. 114/222, 67 R; 204/224; 179/110 A; 310/337

[56] References Cited

U.S. PATENT DOCUMENTS

| 2,435,986 | 2/1948 | Taylor | 204/224 |
| 3,792,204 | 2/1974 | Murayama et al. | 179/110 A |
| 3,832,580 | 8/1974 | Yamamuro et al. | 310/337 |

FOREIGN PATENT DOCUMENTS

| 1031166 | 5/1956 | Fed. Rep. of Germany | 114/222 |
| 719650 | 12/1954 | United Kingdom | 114/67 R |

OTHER PUBLICATIONS

Sheherbakov et al., Central Scientific Research Institute of the Maritime Fleet, No. 160, pp. 39-44, 1972.
*Kureha KF Piezofilm* by Kureha Chemical Ind. Co. Ltd., Jan. 1976.

*Primary Examiner*—Jesus D. Sotelo

[57] ABSTRACT

An effective antifouling result with respect to marine creatures such as barnacles is achieved by energizing a piezofilm layer carried on the outside of a vessel to cause mechanical vibration of the layer.

6 Claims, 3 Drawing Figures

PREVENTING MARINE FOULING

FIELD OF THE INVENTION

This invention relates to alleviating fouling of boats and ships from marine creatures such as barnacles.

BACKGROUND OF THE INVENTION

A persistent problem with boats and ships has long been marine fouling. Various attempts have been made to alleviate such fouling from such creatures as barnacles.

An attempt to that end by ultrasonic vibration of ship hulls, with oscillators coupled inside the hulls, was disclosed in a Russian publication: "Transactions. Technical Operations of the Maritime Fleet. Thermochemical Studies. Control of Corrosion and Fouling. Central Scientific Research Institute of the Maritime Fleet No. 160, 1972."

Piezofilm, so called polymer sheet producing mechanical deformation in both lengthwise and thickness (and widthwise) directions when subjected to voltages therethrough, is disclosed in Murayama et al. U.S. Pat. No. 3,792,204, "Acoustic Transducer Using a Piezoelectric Polyvinylidene Fluoride Resin Film as the Oscillator", granted Feb. 12, 1974, and in a brochure "Kureha KF Piezofilm", published by Kureha Chemical Industry Co., Ltd.

Other attempts at antifouling devices are disclosed in Taylor U.S. Pat. No. 2,435,986, "Antifouling Device", granted Feb. 17, 1948.

STATEMENT OF THE INVENTION

It has been discovered that a highly effective, practical, relatively inexpensive antifouling result using relatively little energy can be achieved by energizing piezofilm carried on the outside of a vessel. In preferred embodiments the piezofilm is secured in upwardly extending spaced strips therealong.

DESCRIPTION OF A PREFERRED EMBODIMENT

The structure and operation of a presently preferred embodiment of the invention are as follows.

Structure

The drawings show the preferred embodiment, then described.

1. DRAWINGS

2. DESCRIPTION

Figure 1:
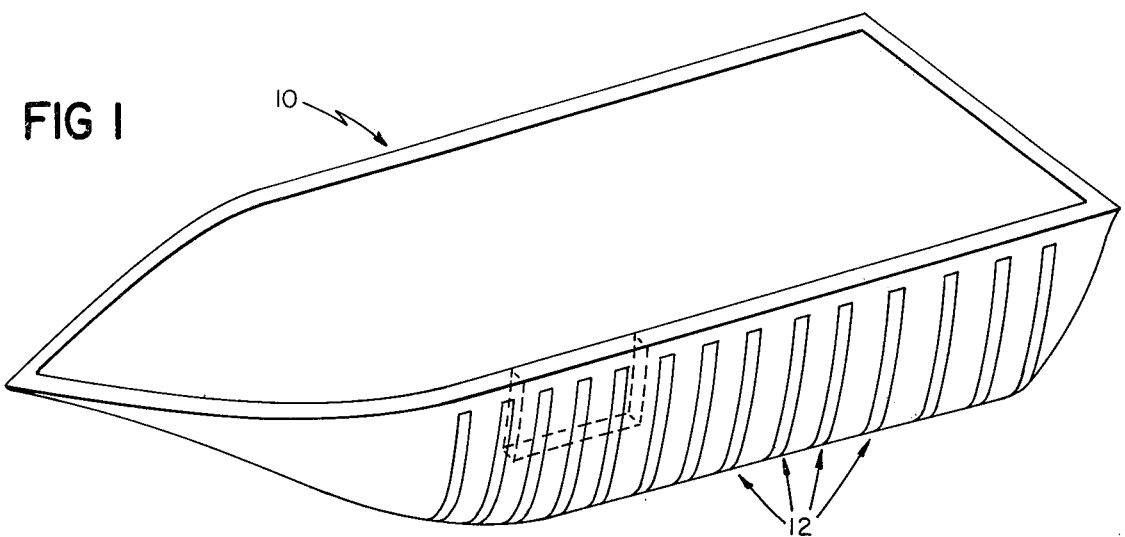
FIG. 1 is a perspective view of a boat hull embodying the invention.
Figure 3:
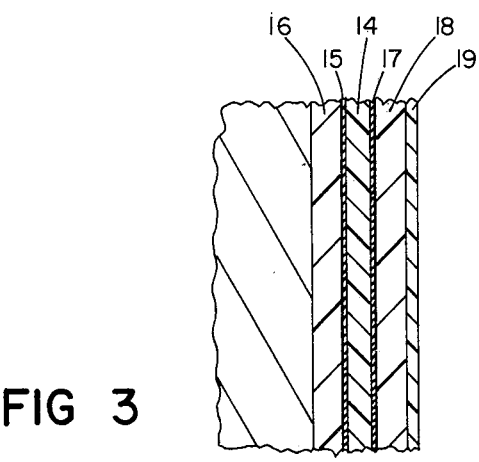
FIG. 3 is a cross-sectional view of a portion of the hull and a portion of one strip assembly of FIG. 2.

A yacht indicated generally at 10 (FIG. 1) has secured to it a multiplicity of strip assemblies indicated generally at 12. Each strip assembly 12 includes a length 14 of piezofilm (FIG. 3) formed of polarized polyvinylidene fluoride, 30 cm. wide and 30 microns in thickness; the piezoelectric coefficients of the piezofilm length are 20 picocoulombs per Newton, in both longitudinal and thickness directions. The strip assemblies 12 are secured to the hull of the yacht with double-sided adhesive silicone tape (Densil brand) strip members 16; and over each piezofilm length is another length of adhesive silicone tape strip 18. On the inside and outside of the piezofilm layer, except along a 1 mm border therearound for insulation, is a thin corrosion resistant electrode layer of sputtered Monel 15, 17. Strip assemblies 12 extend generally transversely of the hull, spaced on 30 cm centers, thus overlying less than half the area of the hull. Conventional epoxy paint 19 is then applied over the whole.

Figure 2:
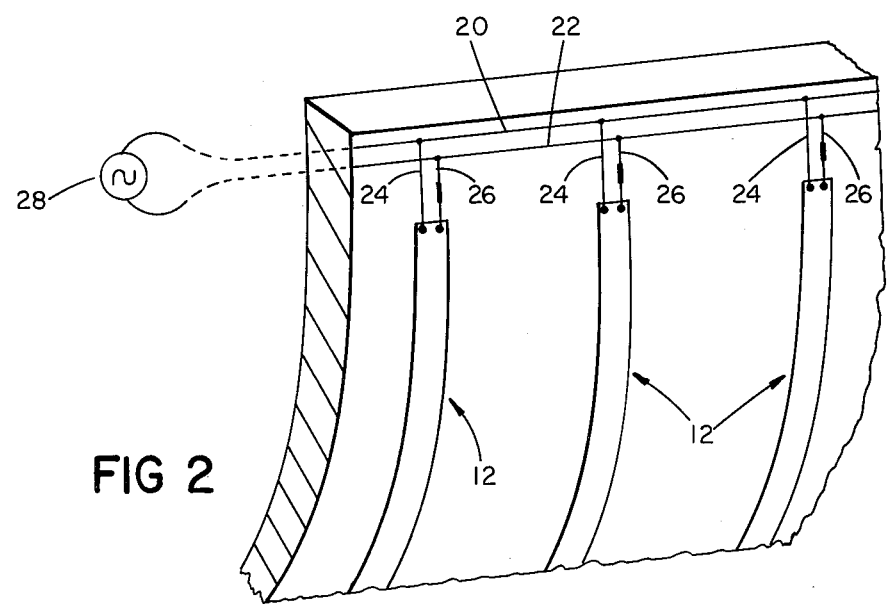
FIG. 2 is an enlarged, perspective view, partially in section, of the portion of the hull indicated in dotted lines in FIG. 1, with circuitry indicated.

Wires 20 and 22 (FIG. 2) running along the top of the hull are connected respectively to leads 24 and 26 connected through conductive, flexible adhesive (CHO-Bond 1038) respectively to front and back strip assembly electrodes, and to 20 volt a.c. power supply 28. Power capacity is 30 to 100 watts, for yachts of 8 to 25 meters. Sinusoidal voltage output frequency is 5 KHz, although other frequencies may be used, as to avoid audio interference.

Operation

In operation, when vessel speed is anything less than 3 knots, energization of the power supply produces longitudinal, transverse, and thickness-wise mechanical vibration of the piezofilm and hull which turns out to be highly effective in discouraging fouling through deposit of marine life such as barnacles, bryozoan, marine worms, and mussels.

Conclusion

Other embodiments within the scope of the invention will occur to those skilled in the art.

What is claimed is:

1. A body for immersion in water in use which comprises:
    a structural portion having an external area to be in contact with said water in use,
    a piezofilm layer of substantial area,
    a first electrode of substantial area,
    a second electrode of substantial area, and
    a power supply,
        said first and second electrodes being in sandwich relation with said piezolayer therebetween, and
        said piezofilm layer, said first electrode, said second electrode, and said structure being integrally joined in the thickness direction of said piezofilm layer,
    whereby electrical change from said power supply vibrates said piezofilm layer over said entire area thereof in width, length and thickness directions, to provide antifouling at low expenditure of energy.

2. The body of claim 1 in which said piezofilm layer is outboard of said body.

3. The combination of claim 1 in which there is a spaced plurality of piezofilm layers.

4. The combination of claim 3 in which said layers overlie less than half the area of said body.

5. The combination of claim 4 in which said body is a ship or boat.

6. The combination of claim 1 in which said body is a ship or boat.

* * * * *

UNITED STATES PATENT AND TRADEMARK OFFICE
CERTIFICATE OF CORRECTION

PATENT NO. : 4,170,185
DATED : October 9, 1979
INVENTOR(S) : Preston V. Murphy et al.

It is certified that error appears in the above-identified patent and that said Letters Patent are hereby corrected as shown below:

Column 1, line 21, "so called polymer sheet" is changed to --so-called polymer sheet--.

Column 1, line 64, "30 cm. wide" is changed to --3 cm. wide--.

Signed and Sealed this

Eleventh Day of March 1980

[SEAL]

Attest:

SIDNEY A. DIAMOND

Attesting Officer

Commissioner of Patents and Trademarks